Q. A. BRACKETT.
RECTIFIER.
APPLICATION FILED APR. 3, 1914.
1,192,741.
Patented July 25, 1916.
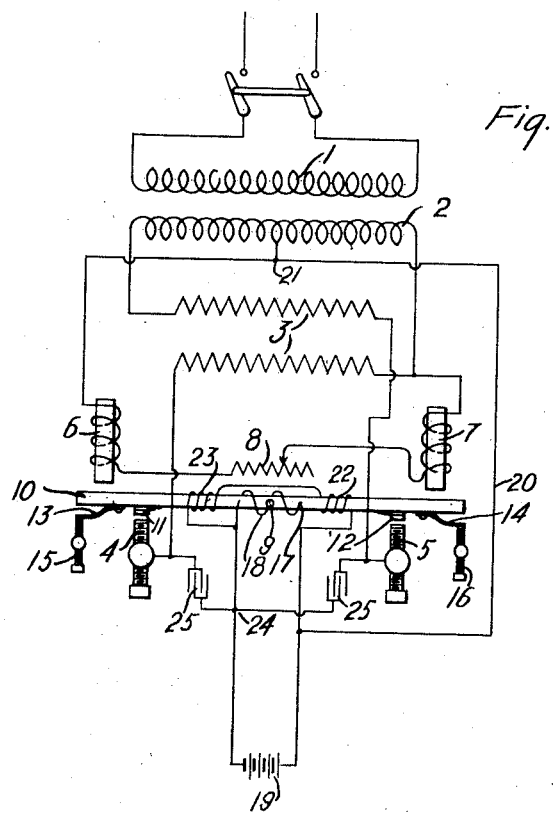
WITNESSES:
F. A. Lind.
D. C. Davis
INVENTOR
Quincy A. Brackett
BY
Wesley G. Carr
ATTORNEY

UNITED STATES PATENT OFFICE.

QUINCY A. BRACKETT, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER.

1,192,741.  Specification of Letters Patent.  Patented July 25, 1916.

Application filed April 3, 1914. Serial No. 829,194.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Rectifiers, of which the following is a specification.

My invention relates to current rectifiers of the vibrating-armature type.

The object of my invention is to so construct rectifiers of the type specified that they will rectify efficiently, without sparking, when supplying loads of varying back electromotive force or of varying current consumption.

Referring to the drawing, Figure 1 is a diagrammatic view of my improved rectifier and Fig. 2 is a diagram of a wave with certain points marked thereon corresponding to certain phenomena met with in the charging of a storage battery.

Referring to Fig. 1, 1 is the primary of a transformer connected to a source of single-phase alternating current.

The terminals of the secondary 2 of the transformer are connected, through regulating resistances 3, to adjustable contact members 4 and 5. Connected in series with each other across a portion of the transformer secondary 2, are two alternating magnets 6 and 7, these magnets being so wound that they, at all times, present like poles in like directions. Inserted in series with the electromagnets 6 and 7 is an adjustable resistance 8 by means of which the current through the magnets may be adjusted in phase with respect to the current in the secondary 2.

Pivotally mounted at a point 9 is an armature member 10 the ends of which are adjacent to the electro-magnets 6 and 7, respectively. Carried by the armature member 10 are spring mounted refractory contact members 11 and 12 to make contact with adjustable contact members 4 and 5, respectively. Mounted on the armature 10 are also spring members 13 and 14 that are adapted to cushion and control the vibrations thereof. Connected to member 10, at a point 17, is a conductor which, after being formed into a coil 18 about the armature member 10 is connected to one terminal of any desired direct-current load, such, for example, as a storage battery 19. The other terminal of the storage battery 19 is connected, by means of a wire 20, to the mid point 21 of the transformer secondary 2. Connected in shunt to the storage battery 19, are coils 22 and 23 that are mounted to embrace the armature member 10. Connected between adjustable contact member 4 and a point 24, and also between adjustable contact member 5 and the point 24 are condensers 25—25.

Having thus described the structure and arrangement of the circuits of my rectifier, I will now set forth, in detail, the operation thereof. Alternating current from secondary 2 generate an alternating flux in magnets 6 and 7. The coils 22 and 23, connected in shunt to the storage battery 19, magnetize the armature member 10 in one direction. The result of the interaction between the unidirectional magnetic field of armature member 10 and the alternating field of magnets 6 and 7 will be that member 10 vibrates in synchronism with the frequency of the alternating-current source. The result of said vibration is that when the left-hand end of the secondary winding 2 is negative with respect to the mid-point 21, the contact members 5 and 12 are in contact and current flow takes place from said secondary winding mid-point 21 through the battery 19 and the shunt armature winding, in parallel to each other, and thence through the series winding 18, the connection point 17 and the contact members 5 and 12 to the left-hand end of said secondary winding. In like manner, a half cycle later, current flows from the mid-point 21 through the load and series winding and returns to the right hand end of the secondary winding 2 through the contact members 4—11.

The smoothness and amplitude of vibration of the member 10 may be adjusted and controlled by screws 15 and 16. The greater the amplitude of vibration, the greater will be the portion of each wave that will be rectified, as the spring-mounted contacts 11 and 12 will remain in contact with contacts 4 and 5 for a greater proportion of the respective half-cycles. The condensers 25—25 being severally shunted across one of the breaks 4—11 and 5—12, will serve to prevent sparking at these points if it happens that the break comes at an instant when current flows. It is intended, however, that the vibration of member 10 may be so adjusted, by means of the adjustment of the phase of the current in members 6 and 7 by resistance 8, that the makes and breaks at the contact members will occur at points of zero current. The device and operation so far set forth do not constitute a part of my invention but are embodied in a copending application of Edgar Giglio, Serial No. 557,582, filed April 25, 1910, renewed December 30, 1911, Serial No. 668,766 and assigned to Westinghouse Electric & Manufacturing Company.

If the rectifier is delivering current to a battery or a motor, the current will be zero when the alternating-current voltage equals the battery or motor back electromotive force, but, if it is delivering current to a pure-resistance load, the current will be zero only when the alternating-current voltage is zero. This is shown diagrammatically in Fig. 2 wherein the line 26—27 represents the back electromotive force of the load. Under these conditions, the point 26 will be the point of zero current and, hence, the proper point to close the circuit. In a similar manner, the point 27 is the point of zero current on the decreasing side of the wave and will be the proper point to break the circuit. On a pure-resistance load the proper points of making and breaking will be 28 and 29, respectively. Assuming line 26—27 to represent the voltage of a storage battery at the beginning of the charge, and line 30—31 to represent the voltage at the end of the charge, it will be seen that the time for making contact grows later and that for breaking contact grows earlier. Accordingly, it follows that, if the rectifier is adjusted to break at zero current at the start of a battery charge, it will not be breaking at zero current after the charge has progressed somewhat. This will result in sparking and burning of contacts and may cause a reverse current in the battery. It is therefore desirable to so modify the rectifier that the time of making and breaking circuit will automatically follow the times of zero current. The effect of the rising voltage of the battery, is to strengthen the direct-current magnets, increasing the amplitude of vibration and so tending to cause the break to occur later instead of earlier. Also, as the charge progresses and the battery voltage rises, the value of the direct current will decrease to a certain extent. This will result in a reduced load on transformer 1, 2 and higher transformer secondary voltage and hence a strengthening of the magnets 6 and 7. This also will tend to increase the amplitude of vibration and cause the break to occur later instead of earlier. The effect on the alternating-current magnets may be slight on a transformer of good voltage regulation but may be marked on a transformer in which the regulation is poor, either by chance or by intention, in order to secure "taper" in the charging current. Thus, it is seen that the natural effect on both the alternating and the unidirectional magnetic fields is in the wrong direction. I propose to correct for this by causing the rectified current to traverse coil 18 to the connection 17 on the member 10. The coil 18 is so wound as to assist coils 22 and 23. The shunt windings 22 and 23 will grow stronger as the battery voltage rises, while the series winding 18 will grow weaker as the charging current falls off. By properly proportioning the shunt and series windings, the amplitude of vibration can be kept constant or may be caused to follow any law desired to keep the time of make and break coincident with the time of zero current.

Having thus disposed of the problem of preventing sparking, when supplying a load of varying voltage and current, it becomes necessary to discuss the effect of varying frequency in the alternating-current supply. The intent, hitherto, has been to make the natural period of vibration of the armature member as near the frequency of the supply as possible. The result of this has been that, if the supply frequency were exactly that for which the rectifier was designed, the amplitude of vibration would be large; while, if the frequency of supply differed to any extent from the rated frequency, there would be a marked diminution in the amplitude of vibration. As set forth above, a variation in the amplitude of vibration has a marked effect on the proper time for making and breaking contact. In order to obviate the objectionable effect of varying frequency, I so design the vibrating member 10 that its natural period of vibration is markedly different from the frequency of supply, so that these vibrations, under the influence of magnets 6 and 7, will be entirely "forced". There will then be very little effect on the amplitude of vibration when there is a change in the supply frequency.

I claim as my invention:

1. In a rectifying system, the combination with a source of alternating current, of a direct-current load having a back electromotive force, and self-starting rectifying apparatus therebetween operated by the interaction of an alternating current winding connected to said source with two direct-current windings, one of which is connected in series with said load and the other of which is connected in shunt to said load.

2. In a rectifying system, the combination with a source of alternating current, of a direct-current load having a back electromotive force, and self-starting rectifying apparatus therebetween which is started by interaction between an alternating-current winding connected to said source and a direct-current winding connected in shunt to said load and in which, during subsequent operation, the action of said shunt winding is supplemented by a direct-current winding connected in series with said load.

3. In a rectifying system, the combination with a source of alternating current, of a direct-current load having a back electromotive force, and self-starting rectifying apparatus therebetween embodying an alternating-current winding connected to said source and a direct-current winding connected in shunt to said load, said source and its winding being electrically independent of said load and its winding in the inoperative condition of said apparatus, and said apparatus being started into operation by the interaction between the magnetic fluxes produced by said two windings.

4. In a rectifying system, the combination with a source of alternating current, of a direct current load having a back electromotive force self-starting rectifying apparatus therebetween embodying an alternating-current winding connected to said source and a direct-current winding connected in shunt to said load, said source and its winding being electrically independent of said load and its winding in the inoperative condition of said apparatus, said apparatus being started into operation by the interaction between the magnetic fluxes produced by said two windings, and a supplemental direct-current winding in said apparatus connected in series with said load, whereby during operation, said apparatus is driven by the interaction between the flux of said alternating-current winding and the flux of said two direct-current windings.

5. The combination with a mechanical rectifier, of a load connected thereto having a variable back-electromotive force, said rectifier embodying means for automatically making and breaking the circuit for each alternating-current wave at substantially the point where the rectifier and load voltages are equal.

6. In a self-starting mechanical rectifier, the combination with a fixed electromagnet excited from a source of alternating current, of a vibratory electromagnet mounted to coact therewith and provided with a compound winding connected for excitation from a direct-current source, and contact members carried by said movable magnet and arranged to coact with fixed contact members to effect rectification of alternating current of the frequency identical with the frequency of vibration of said movable magnet.

7. The combination with a source of alternating current, of a pair of electromagnets connected across said source, an armature mounted at a point between said magnets and presenting a pole to each, a pair of contact members carried by said armature, a pair of fixed contact members mounted to make contact with the respective armature contact members, each of said fixed contact members being connected to a terminal of the alternating-current source, a direct-current circuit, one terminal of which is connected to an intermediate point of the alternating-current source and the other terminal of which is connected to the vibrating armature through a winding embracing said armature, and an additional winding embracing said armature, and connected across the direct-current circuit.

8. The combination with a source of alternating current, of a pair of electromagnets connected across said source, an armature mounted at a point between said magnets and presenting a pole to each, a pair of contact members carried by said armature, a pair of fixed contact members mounted to coact with the respective armature contact members, each of said fixed contact members being connected to a terminal of the alternating-current source, a direct-current circuit, one terminal of which is connected to an intermediate point of the alternating-current source and the other terminal of which is connected to the vibrating armature through a winding embracing said armature, and an additional winding embracing said armature and connected across the direct-current circuit, said coils being cumulatively wound.

9. The combination with a source of alternating current, of a pair of electromagnets connected across said source, an armature mounted at a point between said magnets and presenting a pole to each, a pair of contact members carried by said armature, a pair of fixed contact members mounted to coact with the respective armature contact members, each of said fixed contact members being connected to a terminal of the alternating-current source, a direct current circuit, one terminal of which is connected to an intermediate point of the alternating-current source and the other terminal of which is connected to the vibrating armature through a winding embracing said armature, and an additional winding embracing said armature and connected across the direct-current circuit, said coils being cumulatively wound and said armature having a forced vibration.

10. The combination with a source of alternating current, of a direct-current consumption device having a varying back-electromotive force, and a mechanical rectifier connected therebetween for supplying energy from said source to said device, said rectifier embodying means for automatically adjusting both the time of circuit closing and circuit opening in accordance with the back-electromotive force of the load.

11. The combination with a source of alternating current, of a direct-current consumption device having a varying back-electromotive force, and a mechanical rectifier connected therebetween for supplying energy from said source to said device, said rectifier embodying resilient vibratory contact members and driving means therefor comprising two windings whose excitation varies directly with the voltage of, and the current supplied to, the load, respectively, whereby the time of closing and of opening the circuit, with each supply wave, is automatically rendered substantially coincident with instants at which the rectifier and load voltages are substantially equal and opposite.

In testimony whereof, I have hereunto subscribed my name this 30th day of March, 1914.

QUINCY A. BRACKETT.

Witnesses:
D. J. JACKSON,
B. B. HINES.